United States Patent
Verhoeven

(10) Patent No.: US 7,604,414 B2
(45) Date of Patent: Oct. 20, 2009

(54) ELECTRICAL MACHINE AND ITS BEARINGS

(75) Inventor: Daniel Verhoeven, Nürnberg (DE)

(73) Assignee: Siemens Aktiengesellschaft, Munich (DE)

(*) Notice: Subject to any disclaimer, the term of this patent is extended or adjusted under 35 U.S.C. 154(b) by 418 days.

(21) Appl. No.: 11/568,214

(22) PCT Filed: Apr. 21, 2005

(86) PCT No.: PCT/EP2005/051785

§ 371 (c)(1),
(2), (4) Date: Oct. 23, 2006

(87) PCT Pub. No.: WO2005/107044

PCT Pub. Date: Nov. 10, 2005

(65) Prior Publication Data

US 2007/0217724 A1 Sep. 20, 2007

(30) Foreign Application Priority Data

Apr. 29, 2004 (DE) .................. 10 2004 021 138

(51) Int. Cl.
*F16C 33/66* (2006.01)
*F16C 19/08* (2006.01)
*F16C 23/04* (2006.01)

(52) U.S. Cl. .................... 384/517; 384/611; 384/613

(58) Field of Classification Search .......... 384/465, 384/475, 480, 513, 517–518, 611–612, 613
See application file for complete search history.

(56) References Cited

U.S. PATENT DOCUMENTS

| | | | |
|---|---|---|---|
| 1,448,189 A * | 3/1923 | Brunner .................. 384/611 |
| 2,433,518 A | 12/1947 | Ljunggren et al. | |
| 4,204,442 A | 5/1980 | Nomura | |
| 4,227,755 A * | 10/1980 | Lundberg .................. 384/518 |
| 4,523,864 A * | 6/1985 | Walter et al. ............... 384/613 |
| 4,699,528 A * | 10/1987 | Gotman .................... 384/536 |
| 4,892,423 A | 1/1990 | Takahashi et al. | |
| 4,896,239 A * | 1/1990 | Ghose ...................... 360/267 |
| 5,316,393 A | 5/1994 | Daugherty | |
| 5,342,282 A * | 8/1994 | Letourneur ............... 384/480 |
| 6,848,831 B2 * | 2/2005 | Shimizu ................... 384/517 |
| 7,082,691 B2 * | 8/2006 | Glantz ..................... 384/517 |
| 7,178,987 B2 * | 2/2007 | Bridges et al. ............ 384/475 |

FOREIGN PATENT DOCUMENTS

| DE | M 7104 XII/47 | 12/1956 |
|---|---|---|
| DE | 30 38 112 C2 | 4/1982 |
| DE | 36 26 626 C2 | 2/1987 |
| DE | 90 15 876 U1 | 2/1991 |
| DE | 689 04 444 T2 | 5/1993 |

(Continued)

*Primary Examiner*—Marcus Charles
(74) *Attorney, Agent, or Firm*—Henry M. Feiereisen; Ursula B. Day

(57) ABSTRACT

An electrical machine includes a housing and a shaft which is housed in the housing by means of a fixed bearing and a free bearing. The fixed bearing is formed by two grooved ball bearings which are respectively prestressed in opposite directions by springs. Thus, at least one of the two grooved ball bearings is always prestressed independently of the axial force exerted on the shaft, such that the required radial stiffness of the fixed bearing is guaranteed.

7 Claims, 3 Drawing Sheets

FOREIGN PATENT DOCUMENTS

| DE | 42 24 980 | A1 | 2/1994 |
| DE | 296 03 579 | U | 6/1996 |
| DE | 196 54 089 | A1 | 6/1998 |
| DE | 199 46 383 | A1 | 4/2001 |
| DE | 100 27 187 | A1 | 12/2001 |

* cited by examiner

ELECTRICAL MACHINE AND ITS BEARINGS

BACKGROUND OF THE INVENTION

The present invention relates to an electrical machine having a housing, a first bearing device, which is in the form of a movable bearing, a second bearing device, which is in the form of a fixed bearing, and a shaft, which is mounted with the two bearing devices in the housing such that it can rotate.

The radial resilience of rolling bearings has a substantial influence on the operational response of machines since, owing to the additional elasticity of the bearings, the bending-critical speeds of the rotors are reduced in comparison with the ideal rigid mounting. Rolling bearings also generally have a lower rigidity in the horizontal transverse direction than in the vertical transverse direction since the radial prestress there is not provided by the rotor weight. This results in the natural bending forms being split into a horizontal and a vertical natural bending form, in which case the horizontal one is lower in terms of frequency and therefore oscillation and noise problems are to be expected even at lower speeds.

In practice, this problem is solved in a known manner by rolling bearings being used which can be axially prestressed, for example deep groove ball bearings or angular ball bearings. Above all, the horizontal transverse rigidity of the bearings and therefore also the possible speed range of the machine are therefore increased. In addition, the noise response and the service life of the bearings are positively influenced.

DE 196 54 089 A1 has disclosed a deep groove ball bearing, in the case of which axial prestress is achieved within the bearing by the rolling bodies being pushed alternately axially into one and the opposite end position of the running surfaces by construction elements of the cage. Accordingly, the bearing used is not a bearing which is available as standard. DE 689 04 444 T2 and DE 36 26 626 C2 also describe special constructions of rolling bearings having the option of axial prestress. These variants likewise have the disadvantage that the solutions exclude standard components.

DE 42 24 980 A1 describes a design solution which uses standard rolling bearings and prestresses the bearings in one direction so severely that external loads can bring about a fluctuation in the value of the axial prestress but cannot bring about a reversal of direction. This approach solves the problem in principle, but high static loads on the bearings are even produced within the machine which reduce the service life.

DE 30 38 112 A1 describes a construction with an axial prestress of the bearings which can be adjusted and readjusted. In this case too, some special elements are required and the inner ring of a bearing needs to be designed to be displaceable on the shaft. Since the inner ring in many cases has circumferential load, there is the risk with this variant of frictional corrosion.

In the case of a floating mounting, which is generally known, the two bearings are prestressed, but the rotor is not mounted in a statically determined manner, i.e. it has a degree of translatory freedom in the axial direction.

SUMMARY OF THE INVENTION

The object of the present invention consists in proposing a mounting system in the case of an electrical machine in which the bending-critical speeds are as high as possible and standard components can be used.

This object is achieved according to the invention by an electrical machine having a housing, a first bearing device, which is in the form of a movable bearing, a second bearing device, which is in the form of a fixed bearing, and a shaft, which is mounted with the two bearing devices in the housing such that it can rotate, the second bearing device having two deep groove ball bearings, which are prestressed with respect to one another in each case by a spring device.

In an advantageous manner, rolling-bearing mounting of the rotor of an electrical machine can therefore be provided which axially guides the rotor using simple deep groove ball bearings and spring elements and which applies a minimum axial prestress to all the bearings of the electrical machine, which prestress cannot be canceled by external axial forces on the rotor.

Rotor windings can be arranged on the shaft between the two bearing devices. With the fixed bearing construction according to the invention, it is therefore possible to permanently maintain the high radial rigidity of the deep groove ball bearings and, as a result, to achieve a higher maximum speed.

The two inner rings of the deep groove ball bearings are preferably spaced axially apart from one another by a spacer. As a result, the outer rings of the two deep groove ball bearings can be displaced in the axial direction independently of one another by the spring devices, with the result that axial prestress is always ensured.

A securing element can secure the deep groove ball bearings axially on the shaft. In addition to the frictional force which results, for example, from the bearing inner rings being shrunk onto the shaft, it is therefore ensured that axial forces can be transmitted via the bearing to the housing.

In one preferred embodiment, the spring devices each act on the outer rings of the deep groove ball bearings. In principle, the spring devices could also act on the inner rings, in which case it would be necessary for the outer rings to be fitted tightly in the housing. However, this would have disadvantages in terms of fitting.

It is further preferred if the spring devices each have a helical spring, with which they apply the prestress force. Such helical springs are simple in terms of production and cost-effective. In principle, hydraulic, pneumatic, electrical, magnetic and other spring elements could also be used, however.

At least one of the outer rings of the deep groove ball bearings can also be inserted into the housing with a transition fit. This means that the outer ring can be displaced axially but the mounting in the radial direction is nevertheless determined.

Furthermore, one of the outer rings of the deep groove ball bearings can be rotated freely and radially in the housing. This has the advantage of a clear division of load between the two deep groove ball bearings.

BRIEF DESCRIPTION OF THE DRAWING

The present invention will be explained in more detail with reference to the attached drawings, in which.

DETAILED DESCRIPTION OF PREFERRED EMBODIMENTS

The exemplary embodiment described in more detail below represents a preferred embodiment of the present invention.

Figure 1:
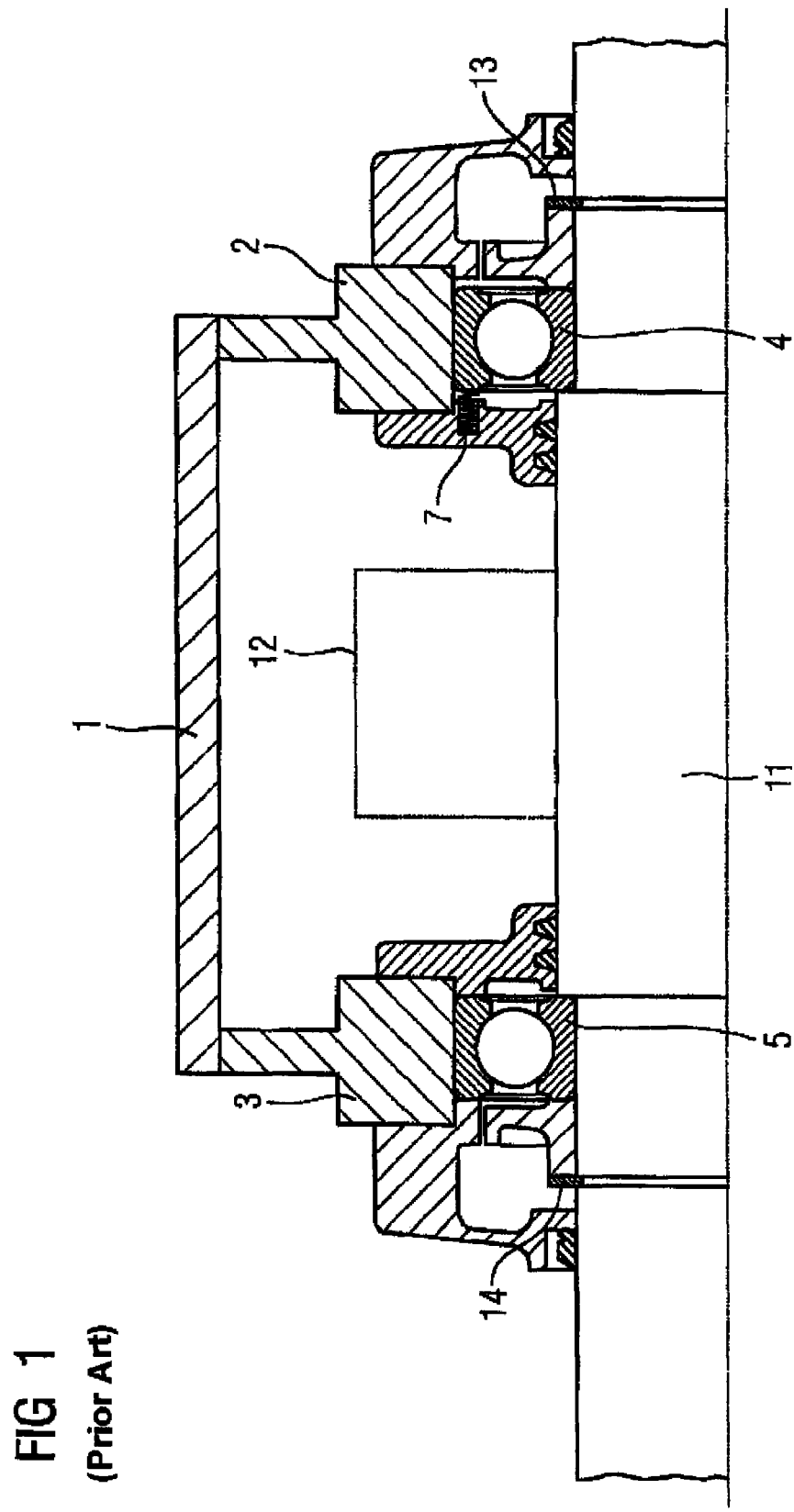
FIG. 1 shows an electrical machine mounted in a conventional manner.

The invention comprises a known and extended rolling bearing mounting system (FIG. 1). This mounting system is incorporated in any desired housing construction 1, 2, 3. A deep groove ball bearing 5 with a tight fit on the inner and outer ring is used as the fixed bearing. The movable bearing is formed by a deep groove ball bearing 4, which has a loose fit on the outer ring. The outer ring can be displaced by a compression spring 7. The two inner rings of the bearings are secured axially on the shaft 11 by securing elements 13, 14. The axial adjusting force of the spring 7 is transferred to the fixed bearing 5 via the rotor 12 and the shaft 11. However, it can be compensated for by an external axial force (for example tensile force on the shaft 11), with the result that the fixed bearing 5 runs free of axial force.

Figure 2:
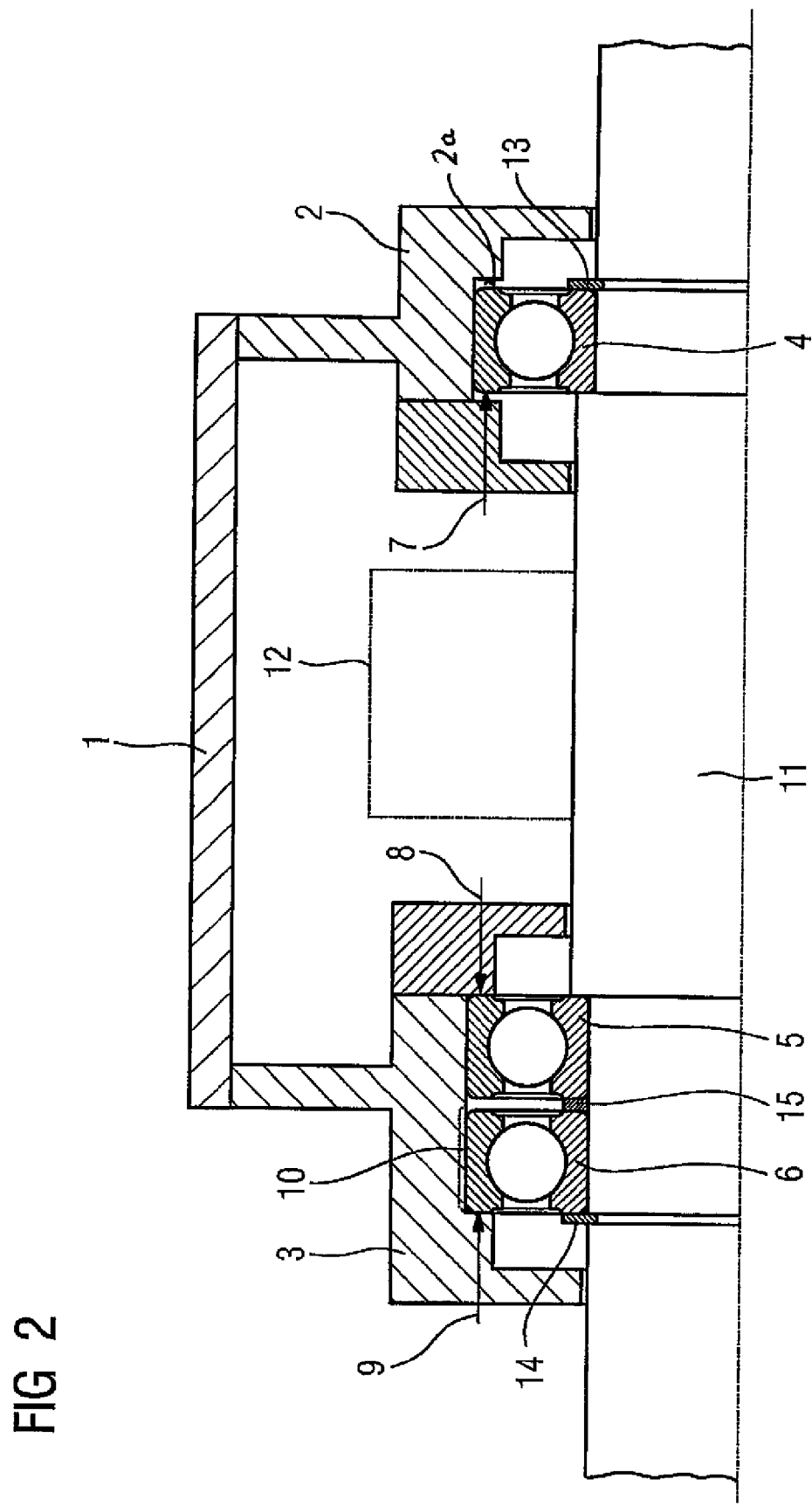
FIG. 2 shows an electrical machine mounted according to the invention in a basic diagram.

The invention uses the same movable bearing principle according to the basic illustration in FIG. 2. Two deep groove ball bearings 5, 6 are used instead of one as the fixed bearing, the inner rings of said deep groove ball bearings resting tightly on the shaft 11 and the deep groove ball bearings being spaced axially apart by a spacer element 15. A securing element 14 secures the inner rings on the shaft axially. The outer rings of the two bearings are inserted with a loose fit into the surrounding housing part 3. Owing to the loose fit, which is also referred to as a transition fit, it is possible to achieve a situation in which the outer rings can be axially displaced with respect to the housing part 3. At the same time, the transition fit ensures sufficient radial rigidity. One of the two outer rings can also be incorporated as indicated by reference numeral 10, such that it is rotated freely and radially, however, as a result of which the corresponding bearing can only accommodate axial loads for reasons of clear load division.

The two bearings 5, 6 of the fixed bearing are fixed axially by the surrounding housing 3, and the outer rings are adjusted by spring elements 8, 9 such that the spring forces point in the direction of the gap produced by the spacer element 15. The direction of the adjusting force of the spring 7 of the movable bearing 4 can be selected as desired.

In the present refinement of the mounting system, the axial adjusting force of the movable bearing 4 has the value of the force of the spring 7 reduced by the frictional force of the outer ring in the housing hole 2*a*, irrespective of an external axial force. The axial force which in total needs to be absorbed by the fixed bearing 5, 6 is calculated from the vectorial addition of the external force acting on the shaft 11, the force of the spring 7 of the movable bearing 4 and the frictional force. Depending on the absolute value for and direction of this total force, only the force of the respective spring 8 or 9 reduced by the associated frictional force is applied axially to a bearing 5 or 6 in the case of the fixed bearing, and the other bearing has the total force applied to it. This total force acts in the bearing and is absorbed on the outer ring proportionally by contact force in the housing. In any case, the axial prestress of one of the two bearings has at least the value of the associated spring adjusting force reduced by the frictional force. Since one of the two bearings 5 or 6 is now always prestressed irrespective of the axial force on the shaft 11, the required radial rigidity of the fixed bearing is always maintained. As a result, it is possible to avoid a situation in which the corresponding radial rigidities are reduced and the machine tends towards higher oscillations and noise values as a result of a state of the overall bearing or one of the two deep groove bearings 5 or 6 which is free of axial forces.

Figure 3:
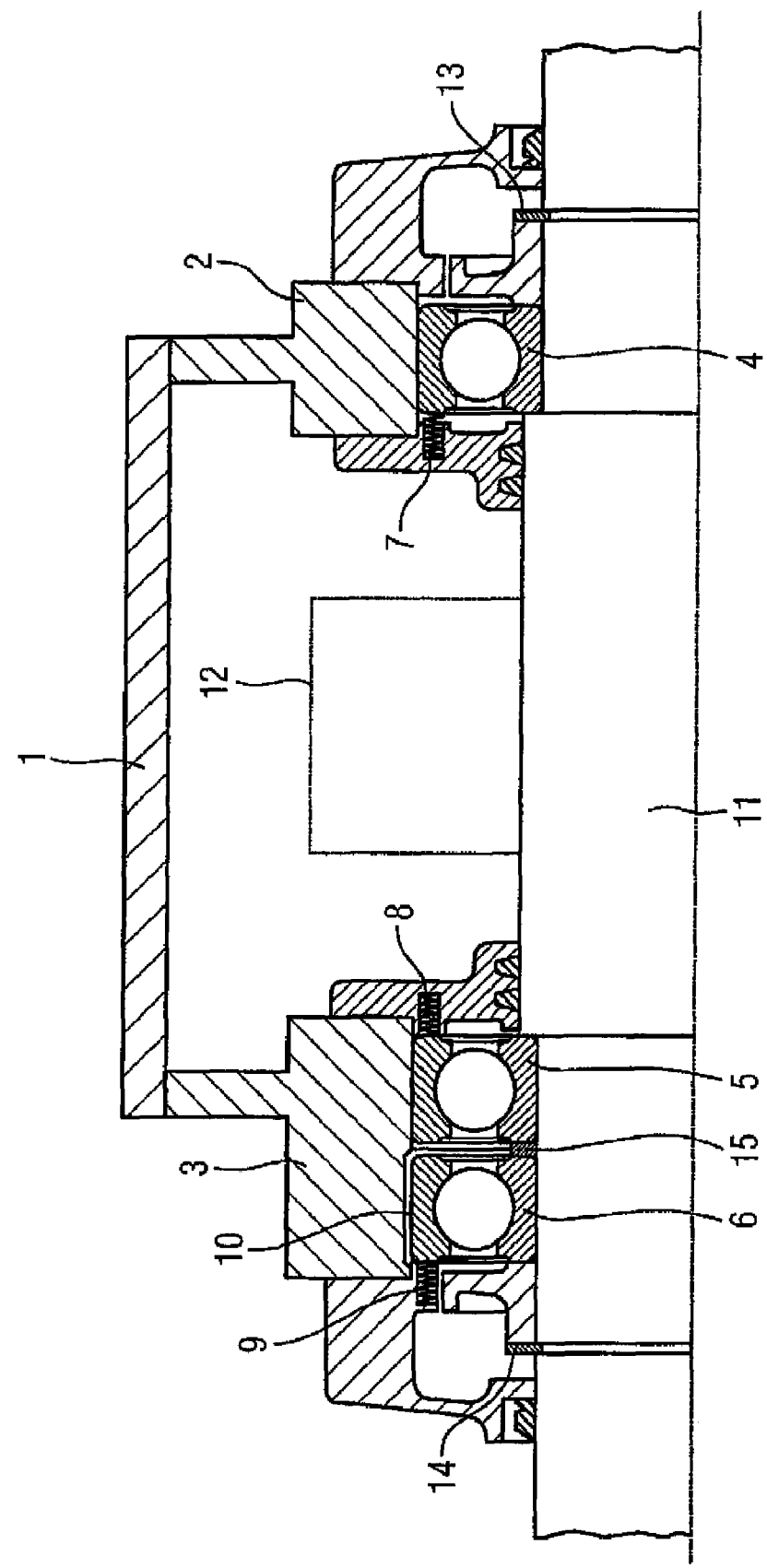
FIG. 3 shows a specific exemplary embodiment of an electrical machine mounted according to the invention.

FIG. 3 reproduces a specific embodiment of an electrical machine according to the invention which is based on the basic illustration in FIG. 2. The spring elements 7, 8 and 9 are in this case specifically in the form of helical springs. This embodiment of a spring element is relatively cost-effective and robust in comparison with other embodiments.

According to the invention, simple standard components are used, without dispensing with the axial guidance of the rotor by means of the option for axial movement of all the outer rings of the mounting system in at least one direction and the action of spring forces on all outer rings, to achieve a situation in which, under any desired external axial force, no bearing can run free of axial forces.

The advantages of the bearing design according to the invention are as follows:
1. Increased radial rigidity by means of prestressing the bearings and therefore higher maximum operating speed;
2. Reduction in bearing noise;
3. No risk of premature damage to bearings owing to on-load operation;
4. No special components required.

The invention claimed is:

1. An electrical machine, comprising:
   a housing;
   a first bearing device constructed as a movable bearing and having an outer ring received in the housing;
   a second bearing device constructed as fixed bearing having two deep groove ball bearings, each having an outer ring received in the housing;
   a spring device acting on the outer rings for prestressing the two deep groove ball bearings to one another;
   a shaft rotatably supported by the first and second bearing devices, with the first and second bearing devices having inner rings secured to the shaft; and
   a spacer to maintain the inner rings of the two deep groove ball bearings in fixed axial spaced-apart relationship.

2. The electrical machine of claim 1, further comprising rotor windings arranged on the shaft between the first and second bearing devices.

3. The electrical machine of claim 1, further comprising securing elements directly acting on the inner rings of the first and second bearing devices for securing the deep groove ball bearings and the movable bearing axially on the shaft.

4. The electrical machine of claim 1, wherein the spring device includes a first spring element acting on the outer ring of one of the deep groove ball bearings, and a second spring element acting on the outer ring of the other one of the deep groove ball bearings.

5. The electrical machine of claim 4, wherein one of the outer rings of the deep groove ball bearings is shaped by free-turning to rotate radially in the housing.

6. The electrical machine of claim 1, wherein the spring device includes a helical spring.

7. The electrical machine of claim 1, wherein at least one of the outer rings of the deep groove ball bearings is inserted into the housing with a transition fit.

\* \* \* \* \*